United States Patent
Nash et al.

(10) Patent No.: US 11,473,434 B2
(45) Date of Patent: Oct. 18, 2022

(54) GAS TURBINE ENGINE AIRFOIL

(71) Applicant: United Technologies Corporation, Farmington, CT (US)

(72) Inventors: Timothy Charles Nash, Vernon, CT (US); Gary A. Zess, Vernon, CT (US); Eric A. Grover, Tolland, CT (US); Jin Hu, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 638 days.

(21) Appl. No.: 16/654,380

(22) Filed: Oct. 16, 2019

(65) Prior Publication Data

US 2021/0115803 A1 Apr. 22, 2021

(51) Int. Cl.
*F01D 5/14* (2006.01)
*F01D 9/02* (2006.01)

(52) U.S. Cl.
CPC .............. *F01D 9/02* (2013.01); *F01D 5/141* (2013.01); *F05D 2240/123* (2013.01); *F05D 2240/124* (2013.01)

(58) Field of Classification Search
CPC ....... F01D 9/02; F01D 5/141; F05D 2240/123
See application file for complete search history.

(56) References Cited

U.S. PATENT DOCUMENTS

| 4,431,376 | A | 2/1984 | Lubenstein et al. |
| 9,765,626 | B2* | 9/2017 | Neubrand ............... F01D 5/148 |
| 2017/0175556 | A1* | 6/2017 | Soni ......................... F01D 9/041 |
| 2018/0231018 | A1* | 8/2018 | Smith ...................... F01D 5/141 |

* cited by examiner

*Primary Examiner* — Sabbir Hasan
(74) *Attorney, Agent, or Firm* — Carlson, Gaskey & Olds, P.C.

(57) ABSTRACT

An airfoil includes pressure and suction sides that extend between a leading edge and a trailing edge. The airfoil has a camber line along an airfoil section that is equidistant between the exterior surface of the pressure and suction sides. The camber line extends from a 0% camber position at the leading edge to a 100% camber position at the trailing edge. A ratio of a maximum thickness to an axial chord length is between 0.2 and 0.5. The maximum thickness is located along the camber line between about 13% and 38% camber position.

20 Claims, 4 Drawing Sheets

GAS TURBINE ENGINE AIRFOIL

BACKGROUND

This disclosure relates to gas turbine engine airfoils. More particularly the disclosure relates to normalized airfoil thickness and pressure side curvature characteristics so as to enable the airfoil to be tolerant of high degrees of incidence variation.

A turbine engine such as a gas turbine engine typically includes a fan section, a compressor section, a combustor section and a turbine section. Air entering the compressor section is compressed and delivered into the combustor section where it is mixed with fuel and ignited to generate high-temperature gas flow. The high-temperature gas flow expands through the turbine section to drive the compressor and the fan section. The compressor section typically includes at least low and high pressure compressors, and the turbine section typically includes at least low and high pressure turbines. In some applications, a power turbine further expands the flow to drive one or more components which are not a part of the gas turbine engine.

Direct drive gas turbine engines include a fan section that is driven directly by one of the turbine shafts. Rotor blades in the fan section and sometimes a low pressure compressor of the compressor section of direct drive engines rotate in the same direction. Geared gas turbine engines have a geared architecture arranged between the fan section and the turbine section. The geared architecture enables the associated compressor of the compressor section to be driven at different rotational speeds than the turbine generating the power for the particular compressor.

The aerodynamics within the turbine section may result in the airfoils seeing a significant change in incidence. This variation in incidence presents design challenges.

SUMMARY

In one exemplary embodiment, an airfoil includes pressure and suction sides that extend between a leading edge and a trailing edge. The airfoil has a camber line along an airfoil section that is equidistant between the exterior surface of the pressure and suction sides. The camber line extends from a 0% camber position at the leading edge to a 100% camber position at the trailing edge. A ratio of a maximum thickness to an axial chord length is between 0.2 and 0.5. The maximum thickness is located along the camber line between about 13% and 38% camber position.

In a further embodiment of any of the above, the pressure and suction sides extend in a radial direction from a 0% span position to a 100% span position. The airfoil section is between 5% and 95% span.

In a further embodiment of any of the above, a thickness of the airfoil as a percentage of the maximum thickness is between about 28% and about 76% at a 5% camber position.

In a further embodiment of any of the above, a thickness of the airfoil as a percentage of the maximum thickness is between about 4% and about 20% at a 95% camber position.

In a further embodiment of any of the above, the pressure side has a radius of curvature divided by the axial chord length of between −1 and −3 at about a 46% axial position.

In a further embodiment of any of the above, the pressure side has a radius of curvature divided by the axial chord length of between 1.6 and 5.2 at about a 5% axial position.

In a further embodiment of any of the above, the pressure side has a radius of curvature divided by the axial chord length of between −0.1 and −1.6 at about a 95% axial position.

In a further embodiment of any of the above, a thickness of the airfoil as a percentage of the maximum thickness over the camber position is within a first and a second thickness trend line as shown in FIG. 5.

In a further embodiment of any of the above, the pressure side has a radius of curvature divided by a chord length over the axial chord position within a first and a second curvature trend line as shown in FIG. 6.

In a further embodiment of any of the above, the pressure side has a radius of curvature divided by a chord length over the axial chord position within a first and a second curvature trend line as shown in FIG. 6.

In another exemplary embodiment, a gas turbine engine includes a combustor section arranged between a compressor section and a turbine section. An airfoil is arranged in one of the compressor section and the turbine section. The airfoil has pressure and suction sides that extend between a leading edge and a trailing edge. The airfoil has a camber line along an airfoil section that is equidistant between the exterior surface of the pressure and suction sides. The camber line extends from a 0% camber position at the leading edge to a 100% camber position at the trailing edge. A ratio of a maximum thickness to an axial chord length is between 0.2 and 0.5. The maximum thickness is located along the camber line between about 13% and 38% camber position.

In a further embodiment of any of the above, the airfoil is a stator airfoil.

In a further embodiment of any of the above, the airfoil is a rotor airfoil.

In a further embodiment of any of the above, the airfoil is arranged in the turbine section.

In a further embodiment of any of the above, a thickness of the airfoil as a percentage of the maximum thickness is between about 28% and about 76% at a 5% camber position. The thickness of the airfoil as a percentage of the maximum thickness is between about 4% and about 20% at a 95% camber position.

In a further embodiment of any of the above, the pressure side has a radius of curvature divided by the axial chord length of between 1.6 and 5.2 at about a 5% axial position. The radius of curvature is divided by the axial chord length of between −0.1 and −1.6 at about a 95% axial position In a further embodiment of any of the above, the pressure side has a radius of curvature divided by the axial chord length of between −1 and −3 at about a 46% axial position.

In a further embodiment of any of the above, a thickness of the airfoil as a percentage of the maximum thickness over the camber position is within a first and a second thickness trend line as shown in FIG. 5.

In a further embodiment of any of the above, the pressure side has a radius of curvature divided by a chord length over the axial chord position within a first and a second curvature trend line as shown in FIG. 6.

In a further embodiment of any of the above, the pressure side has a radius of curvature divided by a chord length over the axial chord position within a first and a second curvature trend line as shown in FIG. 6.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
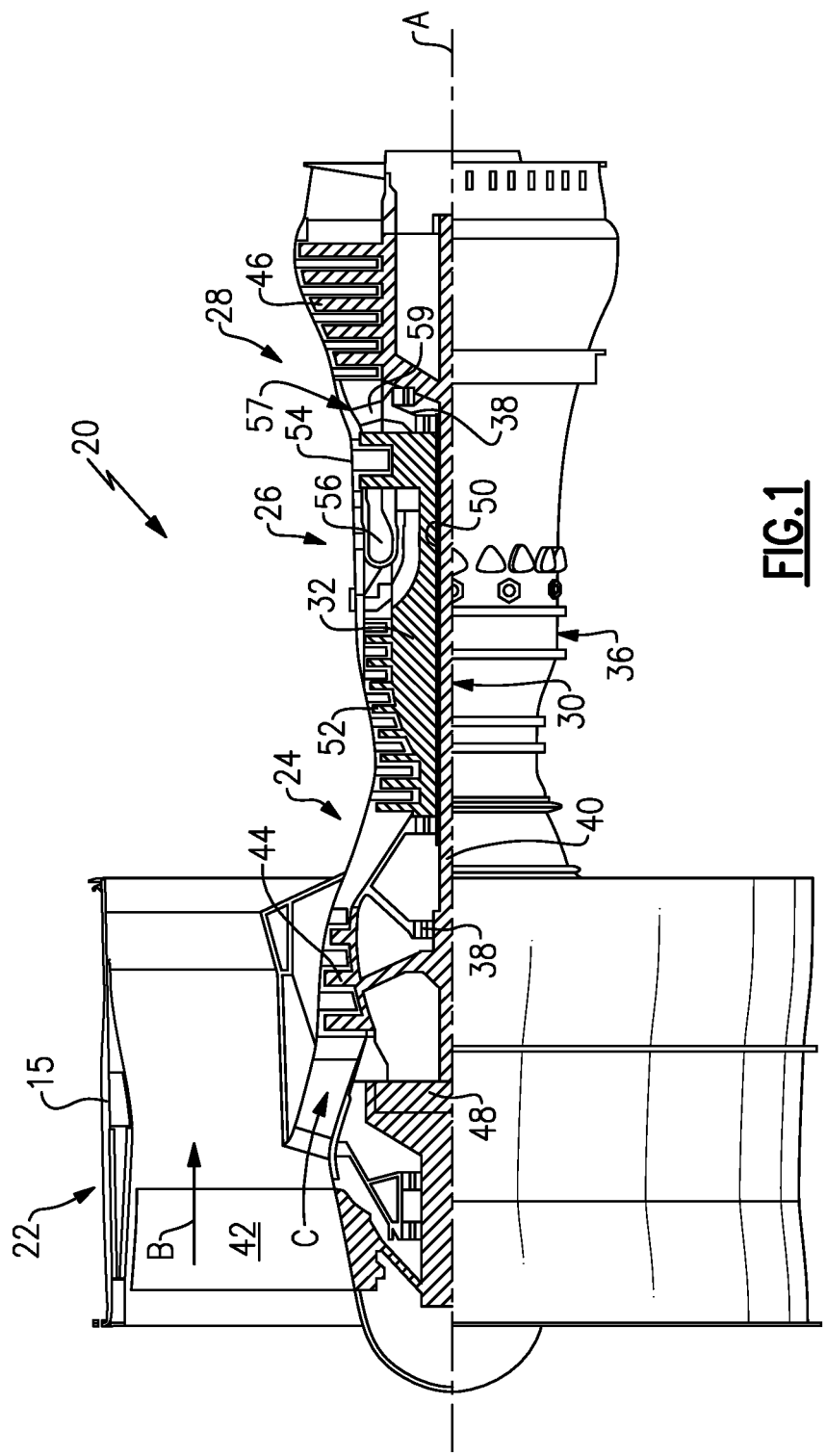
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool turbofan architectures, turbojet, turboramjet, turboprob, or turboshaft engines.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes. In some applications, a power turbine further expands the flow to drive one or more components which are not a part of the gas turbine engine.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. Although depicted with a mid-turbine frame in the gas turbine engine in the disclosed non-limiting embodiment, it should be understood that the concepts described herein are not limited to an architecture featuring a mid-turbine frame. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2A:
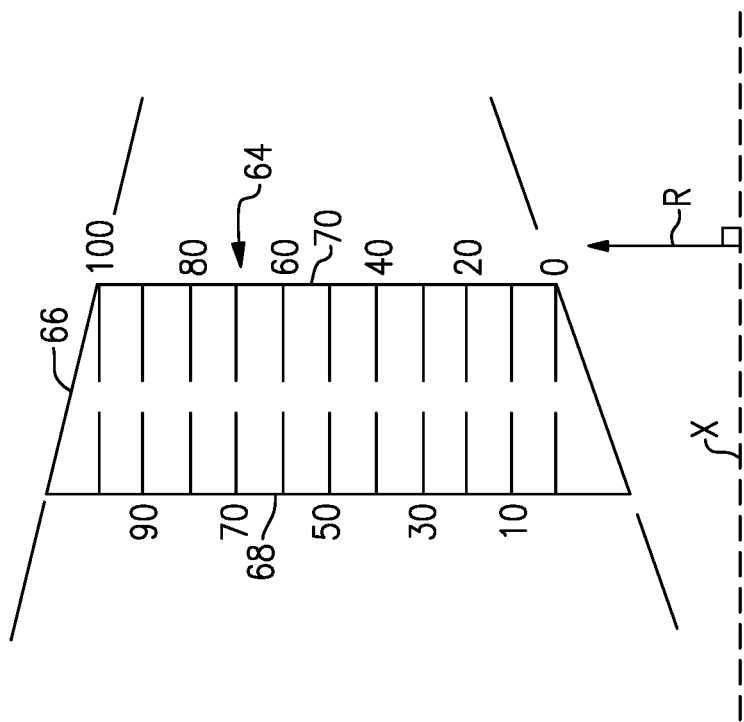
FIG. 2A is a schematic view of airfoil span positions for an example airfoil.
Figure 2B:
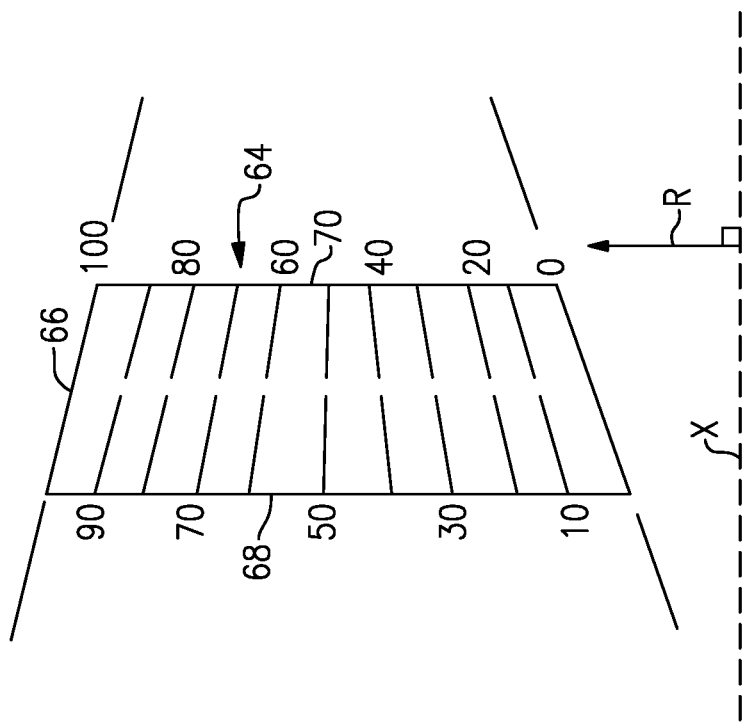
FIG. 2B is a schematic view of airfoil span positions for another example airfoil.

FIGS. 2A and 2B illustrate an example airfoil 64. The airfoil 64 may be a turbine vane or blade, for example. Span positions on an airfoil 64 are schematically illustrated from 0% to 100% in 10% increments. Each section at a given span position is oriented in an aerodynamically relevant fashion, which can be either a conical cut that corresponds to the shape of the core flow path, as shown by the large dashed lines in FIG. 2A, or some other aerodynamically relevant section cut, for example, at constant radii, as shown by the large dashed lines in FIG. 2B. In some examples, the airfoil 64 has an integral platform. In the case of an airfoil with an integral platform, the 0% span position corresponds to the radially innermost location where the airfoil meets the fillet joining the airfoil to the inner platform. In the case of an airfoil without an integral platform, the 0% span position corresponds to the radially innermost location where the discrete platform meets the exterior surface of the airfoil. For airfoils having no outer platform, such as unshrouded blades, the 100% span position corresponds to the tip 66. For airfoils having no platform at the inner diameter, such as cantilevered stators, the 0% span position corresponds to the inner diameter location of the airfoil. For stators, the 100% span position corresponds to the outermost location where the airfoil meets the fillet joining the airfoil to the outer platform.

Figure 3:
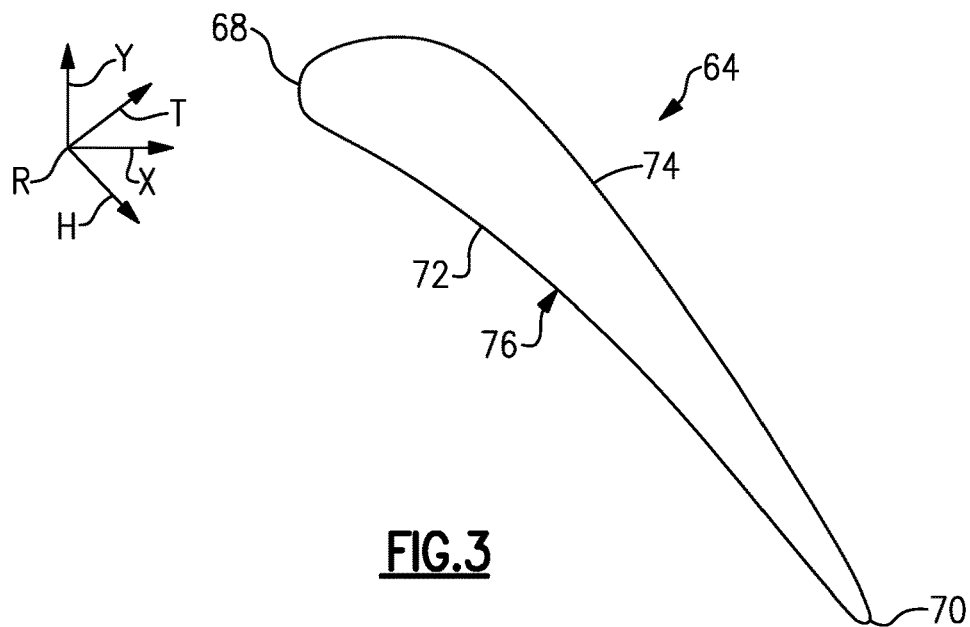
FIG. 3 is a schematic view of a cross-section of an airfoil sectioned at a particular span position and depicting directional indicators.

Referring to FIG. 3, and with continued reference to FIGS. 2A and 2B, airfoils are specifically designed radially from an inner airfoil location (0% span) to an outer airfoil location (100% span) and along circumferentially opposite pressure and suction sides 72, 74 extending in chord between a leading and trailing edges 68, 70. Each airfoil is specifically designed with a particular thickness and curvature along the airfoil. Airfoil geometric shapes, stacking offsets, chord profiles, stagger angles, sweep and dihedral angles, among other associated features, are incorporated individually or collectively to improve characteristics such as aerodynamic efficiency, structural integrity, and vibration mitigation, for example, in a gas turbine engine.

The airfoil 64 has an exterior surface 76 providing a contour that extends from a leading edge 68 generally aftward in a chord-wise direction H to a trailing edge 70, as shown in FIG. 3. Pressure and suction sides 72, 74 join one another at the leading and trailing edges 68, 70 and are spaced apart from one another in an airfoil thickness direction T. An array of airfoils 64 are positioned about the axis X (corresponding to the turbine center line direction) in a circumferential or tangential direction Y. Any suitable number of airfoils may be used for a particular stage in a given engine application.

The exterior surface 76 of the airfoil 64 generates lift based upon its geometry and directs flow along the core flow path C. The airfoil 64 may be constructed from any composite material, aluminum alloy, titanium alloy, nickel alloy or super-alloy, iron alloy or a combination of one or more of these. Abrasion-resistant coatings or other protective coatings may be applied to the airfoil. Furthermore, the airfoil may be solid or cored for cooling or weight reduction purposes, and may or may not feature film cooling. The rotor stages may be constructed as an integrally bladed rotor, if desired, or discrete blades having roots secured within corresponding rotor slots of a disc. The stators may be provided by individual vanes, clusters of vanes, or a full ring of vanes.

Airfoil geometries can be described with respect to various parameters provided. The disclosed graph(s) illustrate the relationships between the referenced parameters within 5% of the desired values, which correspond to a cold aerodynamic design for the airfoil, so as to enable physical inspection. It should be understood that the airfoils may be oriented differently than depicted, depending on the rotational direction of the blades. The signs (positive or negative) used, if any, in the graphs of this disclosure are controlling and the drawings should then be understood as a schematic representation of one example airfoil if inconsistent with the graphs. The signs in this disclosure, including any graphs, comply with the "right hand rule."

Figure 4:
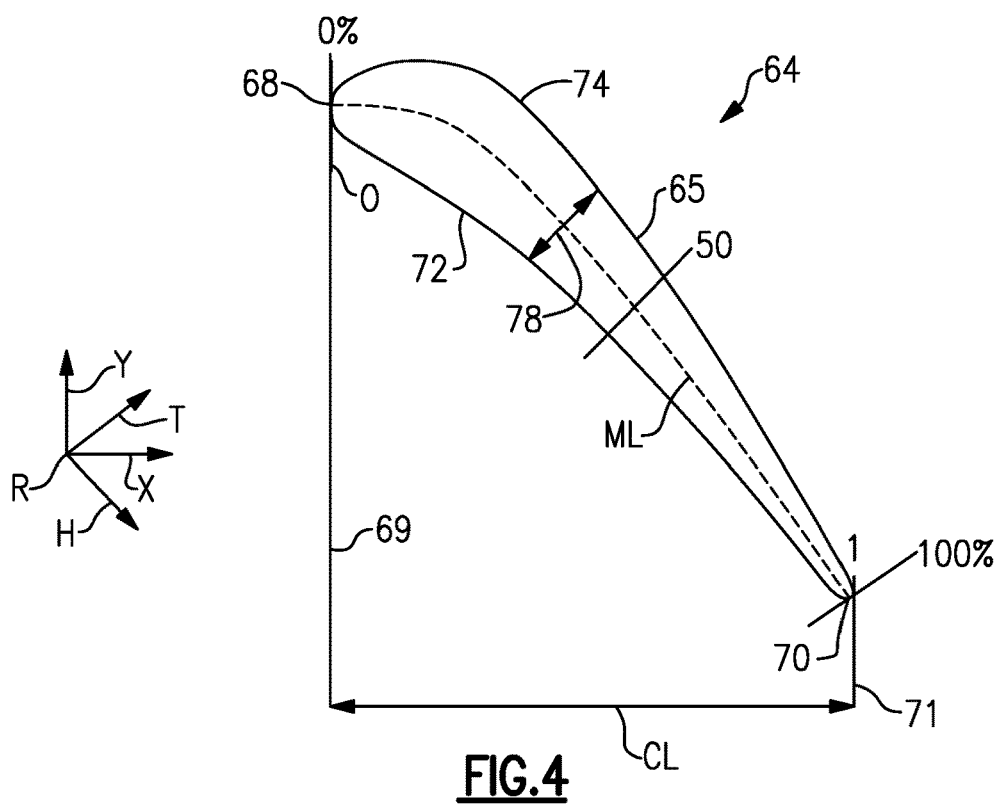
FIG. 4 is a schematic view of an airfoil depicting mean camber of the airfoil.

FIG. 4 shows an example airfoil section 65 of the airfoil 64. As shown, the airfoil 64 is sectioned at a radial position between the root and the tip. The airfoil section 65 may be between about the 5% and 95% span positions. In a further embodiment, the airfoil section 65 may be between about the 25% and 75% span positions. A camber mean line ML lies within the airfoil section and is equidistant between the exterior surface of the pressure and suction sides 72, 74. Camber positions on the airfoil 64 are schematically illustrated from 0% to 100%. The camber mean line ML intersects the leading edge 68 at a 0% camber position, and intersects the trailing edge 70 at a 100% camber position. An axial chord CL of the airfoil section 65 is a straight line along the turbine center line axis X that extends from a most upstream location 69 to the turbine centerline at a most downstream location 71 on the airfoil surface 76. A normalized axial position is the position along the axial chord CL divided by the axial chord length. Normalized axial positions on the airfoil 64 are schematically illustrated from 0 to 1. The axial chord CL intersects the turbine centerline most upstream location 69 at a 0 axial position, and intersects the turbine centerline most downstream location 71 at a 1 axial position.

An airfoil thickness 78 is defined as the distance between the pressure and suction sides 72, 74 normal to the camber mean line ML. The airfoil 64 has a maximum thickness between the leading and trailing edges 68, 70. A ratio of the maximum thickness to the axial chord length is between 0.2 and 0.5. The specified parameter enables the communication of a distinct normalized shape, which has characteristics that enable an incident tolerant geometry for high levels of positive or negative incidence. For geometries outside of the specified bounds, and with high levels of positive or negative incidence, undesirable aerodynamic characteristics are encountered. The pressure side 72 has a radius of curvature that varies between the leading and trailing edge 68, 70.

Figure 5:
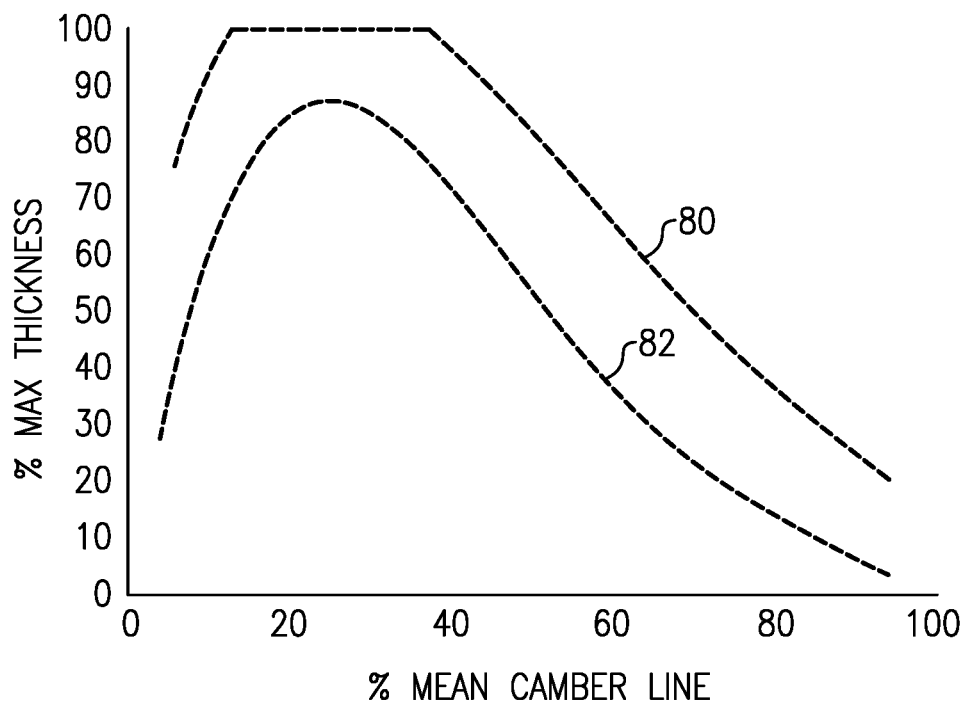
FIG. 5 graphically depicts a curve of an example airfoil thickness to camber position.

FIG. 5 illustrates the airfoil thickness 78 over the camber position for an airfoil section 65. The thickness 78 is shown as a percentage of the maximum thickness. That is, the thickness on the y-axis is the airfoil thickness as a percentage of the maximum thickness in the airfoil section 65. The graph depicts a first thickness trend line 80 and a second thickness trend line 82. The airfoil thickness 78 is between the first and second thickness trend lines 80, 82 along the camber position of the airfoil section 65. The maximum thickness may be located between about 13% and 38% camber position. The airfoil section has a thickness between about 28% and about 76% at a 5% camber position. The airfoil section has a thickness between about 4% and about 20% at 95% camber position.

Figure 6:
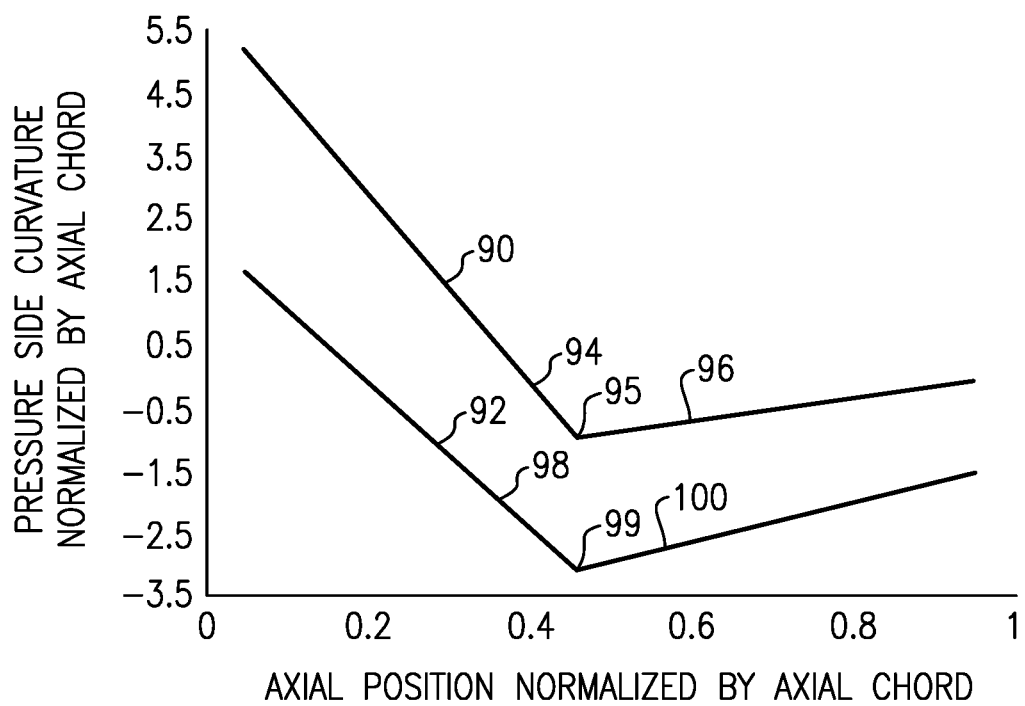
FIG. 6 graphically depicts a curve of an example airfoil pressure side curvature to turbine centerline, or axial position.

FIG. 6 illustrates the pressure side curvature over the turbine axial (relative to turbine centerline) position for an airfoil section. The graph depicts a first curvature trend line 90 and a second curvature trend line 92. The pressure side curvature is between the first and second curvature trend lines 90, 92 along the turbine axial position of the airfoil section 65. The first curvature trend line 90 has a first portion 94 and a second portion 96. The second curvature trend line 92 has a first portion 98 and a second portion 100. The first portions 94, 98 generally have a negative slope, while the second portions 96, 100 have a positive slope. The first portions 94, 98 may have a steeper slope than the second portions 96, 100. The first portions 94, 98 and the second portions 96, 100 meet at a point 95, 99, respectively. The point 95, 99 may be at about the 46% axial position. The pressure side radius of curvature divided by a chord length may be between −1 and −3 at about the 46% axial position. The radius of curvature divided by a chord length may be between 1.6 and 5.2 at about a 5% axial position. The radius of curvature divided by a chord length may be between −0.1 and −1.6 at about a 95% axial position. The specified parameters enable the communication of a distinct normalized shape, which has characteristics that enable an incident tolerant geometry for high levels of positive or negative incidence. For geometries outside of the specified bounds, and with high levels of positive or negative incidence, undesirable aerodynamic characteristics are encountered.

For turbines that are required to operate at high efficiency over a wide range of speeds or pressure ratios, the airfoils can see significant changes in incidence. The magnitude of the change in incidence is a function of the turbine operating range. The disclosed airfoil provides a unique aerodynamic design that may perform well under high levels of positive or negative incidence. The specified parameters enable the communication of a distinct normalized shape, which has characteristics that enable an incident tolerant geometry for high levels of positive or negative incidence. For geometries outside of the specified bounds, and with high levels of positive or negative incidence, undesirable aerodynamic characteristics are encountered.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil, comprising:
   pressure and suction sides extending between a leading edge and a trailing edge, the airfoil having a camber line along an airfoil section that is equidistant between an exterior surface of the pressure and suction sides, the camber line extends from a 0% camber position at the leading edge to a 100% camber position at the trailing edge, wherein a ratio of a maximum thickness to an axial chord length is between 0.2 and 0.5, and wherein the maximum thickness is located along the camber line between 13% and 38% camber position;
   wherein the pressure and suction sides extend in a radial direction from a 0% span position to a 100% span position, and the airfoil section is between 5% and 95% span; and
   wherein a thickness of the airfoil as a percentage of the maximum thickness is between 28% and 76% at a 5% camber position.

2. The airfoil according to claim 1, wherein the thickness of the airfoil as the percentage of the maximum thickness is between 4% and 20% at a 95% camber position.

3. The airfoil according to claim 1, wherein the thickness of the airfoil as the percentage of the maximum thickness over a camber position of the airfoil section is within a first and a second thickness trend line as shown in FIG. 5.

4. The airfoil according to claim 3, wherein the pressure side has a radius of curvature divided by the axial chord length over an axial chord position of the airfoil section within a first and a second curvature trend line as shown in FIG. 6.

5. The airfoil according to claim 1, wherein the pressure side has a radius of curvature divided by the axial chord length over an axial chord position of the airfoil section within a first and a second curvature trend line as shown in FIG. 6.

6. The airfoil according to claim 1, wherein the airfoil is a rotor airfoil.

7. An airfoil comprising:
   pressure and suction sides extending between a leading edge and a trailing edge, the airfoil having a camber line along an airfoil section that is equidistant between an exterior surface of the pressure and suction sides, the camber line extends from a 0% camber position at the leading edge to a 100% camber position at the trailing edge, wherein a ratio of a maximum thickness to an axial chord length is between 0.2 and 0.5, and wherein the maximum thickness is located along the camber line between 13% and 38% camber position;
   wherein the pressure and suction sides extend in a radial direction from a 0% span position to a 100% span position, and the airfoil section is between 5% and 95% span; and
   wherein the pressure side has a radius of curvature divided by the axial chord length of between −1 and −3 at a 46% axial position.

8. The airfoil according to claim 7, wherein the pressure side has the radius of curvature divided by the axial chord length of between 1.6 and 5.2 at a 5% axial position.

9. The airfoil according to claim 8, wherein the pressure side has the radius of curvature divided by the axial chord length of between −0.1 and −1.6 at a 95% axial position.

10. The airfoil according to claim 7, wherein the airfoil is a stator airfoil.

11. The airfoil according to claim 7, wherein the airfoil is a rotor airfoil.

12. A gas turbine engine comprising:
    a combustor section arranged between a compressor section and a turbine section;
    an airfoil arranged in one of the compressor section and the turbine section, the airfoil having pressure and suction sides extending between a leading edge and a trailing edge, the airfoil having a camber line along an airfoil section that is equidistant between an exterior surface of the pressure and suction sides, the camber line extends from a 0% camber position at the leading edge to a 100% camber position at the trailing edge, wherein a ratio of a maximum thickness to an axial chord length is between 0.2 and 0.5, wherein the maximum thickness is located along the camber line between 13% and 38% camber position; and
    wherein a thickness of the airfoil as a percentage of the maximum thickness is between 28% and 76% at a 5% camber position, and the thickness of the airfoil as the percentage of the maximum thickness is between 4% and 20% at a 95% camber position.

13. The gas turbine engine according to claim 12, wherein the airfoil is a stator airfoil.

14. The gas turbine engine according to claim 12, wherein the airfoil is a rotor airfoil.

15. The gas turbine engine according to claim 12, wherein the airfoil is arranged in the turbine section.

16. The gas turbine engine according to claim 12, wherein the pressure side has a radius of curvature divided by the axial chord length of between 1.6 and 5.2 at a 5% axial position, and the radius of curvature divided by the axial chord length of between −0.1 and −1.6 at a 95% axial position.

17. The gas turbine engine according to claim 16, wherein the pressure side has the radius of curvature divided by the axial chord length of between −1 and −3 at about a 46% axial position.

18. The gas turbine engine according to claim 12, wherein the thickness of the airfoil as the percentage of the maximum thickness over a camber position of the airfoil section is within a first and a second thickness trend line as shown in FIG. 5.

19. The gas turbine engine according to claim 18, wherein the pressure side has a radius of curvature divided by the axial chord length over an axial chord position within a first and a second curvature trend line as shown in FIG. 6.

20. The gas turbine engine according to claim 12, wherein the pressure side has a radius of curvature divided by the axial chord length over an axial chord position within a first and a second curvature trend line as shown in FIG. 6.

* * * * *